United States Patent Office 3,213,094
Patented Oct. 19, 1965

3,213,094
METHOD OF PREPARING QUINAZOLONES
Jack F. Morgan, Delmar, and William C. Simmons, Albany, N.Y., assignors to General Aniline & Film Corporation, New York, N.Y., a corporation of Delaware
No Drawing. Filed June 6, 1963, Ser. No. 285,896
5 Claims. (Cl. 260—251)

The present invention relates to an improved method of preparing substituted 4-quinazolones having a higher degree of purity in higher yield and in a more economical manner than heretofore obtainable.

The preparation of substituted 4-quinazolones by the reaction of an N-acyl-o-aminocyclic carboxylic acid, a primary organic amine and phosphorous trichloride or phosphorous oxychloride in the presence of a liquid inert organic solvent is described in United States Patent 2,439,386 issued on April 3, 1948, to Alfred Guenther and Jack F. Morgan. This process presupposes a previous acylation, separation and possible purification in order to obtain the N-acyl-o-aminocyclic carboxylic acid used as the starting material. The reaction by which such quinazolones are produced in yields ranging from 61% to 80% of the theoretical, assuming that the N-acyl-o-aminocyclic carboxylic acid is N-acetylanthranilic acid and that the primary organic amine is aniline, is graphically represented in said patent as follows:

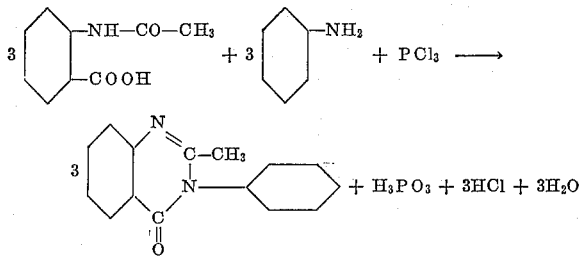

Equation 1

Overall yields of course are considerably less when the acylation of anthranilic acid is included in the calculation.

We have discovered that a product having a higher degree of purity and an overall increased yield can be obtained in a much more economical manner. In order to achieve this, the acylation of anthranilic acid, condensation with a primary amine and ring closure are carried out simultaneously in a one-step process. By employing a one-step process, the initial steps of acylation, isolation and purification to obtain the intermediary acylated anthranilic acid are eliminated which considerably reduces the cost of the operation due to the reduction in time, labor and equipment. We have also discovered that if excess of primary amine is employed, for example if, in Equation 1, the 3 moles of aniline are replaced by 3 to 6 moles of aniline, and preferably closer to 6 moles, improved overall yields are obtained up to about 90%.

Assuming that the o-aminocyclic carboxylic acid is anthranilic acid, the acylating agent is acetic anhydride, and the primary organic amine is aniline, the reaction may be graphically represented as follows:

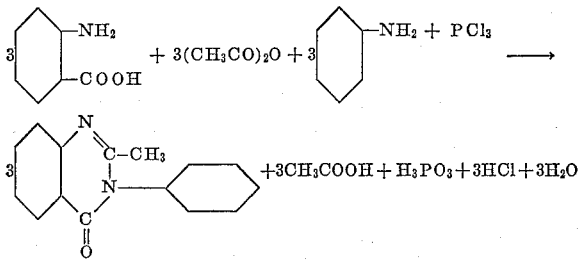

Equation 2

From the foregoing reaction it will be noted that as acylation of the o-aminocarboxylic acid progresses, there is always present an aliphatic monocarboxylic acid—in this case acetic acid—from the corresponding anhydride. We have discovered that the presence of this acid contributes to the purity of the resulting quinazolone yielding a product which is much whiter and has a higher melting point than is otherwise obtainable. This is of special importance since the outstanding use for these products is as soporifics and hypnotics for human consumption.

That the presence of the acylating acid during the condensation and ring closure is important in obtaining a high degree of purity, the process of United States Patent 2,439,386 was repeated with the exception that an additional 3 moles of acetic acid was present during the reaction. The product obtained in this case was considerably whiter and had a higher melting point than when the reaction was carried out exactly according to the method described in the patent, i.e. without the addition of 3 moles of acetic acid.

In carrying out the reaction 1 mole of an o-amino cyclic carboxylic acid is slurried with from 1 to 10 moles of a normally liquid aliphatic or aromatic inert solvent-diluent, then at a temperature not above 60° C., 1 to 1½ moles of an acid anhydride containing from 2 to 12 carbon atoms is added. From 1 to 2½ moles, and preferably about 2 moles, of a primarily organic amine is then added slowly followed by the slow addition of from 1 to 3 moles of either phosphorus trichloride, phosphorus oxychloride or thionyl chloride. The reaction mixture is then heated to from 80° C. to reflux temperature and agitated for a period of time ranging from ½ to 2 hours. The reaction mixture is then cooled to about 100° C. and from 1½ to 2½ parts by volume of water per one part by weight of the o-amino cyclic carboxylic acid are added followed by the addition of the stoichiometrical amount of an alkali such as alkali metal carbonate or hydroxide to neutralize the acids formed during the acylation-condensation-ring closure and removal of the inert solvent-diluent and excess primary organic amine by steam distillation. The resulting product is permitted to cool to a temperature of about 50° C. and then allowed to crystallize. It is then filtered and washed well with water.

As examples of o-aminocyclic carboxylic acids which may be employed as intermediates for the production of quinazolones, the following are illustrative; anthranilic acid, 5-chloroanthranilic acid, o-aminonaphthoic acid, 5-nitroanthranilic acid, 6-methylanthranilic acid, 5-ethoxyanthranilic acid, 3-amino-2-naphthoic acid, 3-amino-2-pyridinecarboxylic acid, and the like.

The amines which may be employed in this reaction must contain a primary amino group and may be either aliphatic, aromatic or araliphatic. The aromatic amines may be substituted by monovalent substitutents such as halogen, nitro, alkyl or alkoxy. Illustrative examples of aliphatic amines include methylamine, ethylamine, butylamine, octylamine, laurylamine, stearylamine, methyl hydrazine, ethyl hydrazine, and the like. If the aromatic amine employed contains a condensed ring system such as a naphthyl radical, the amine group should preferably appear in the β- rather than in the α- position thereof. Thus it has been found that whereas β-naphthylamine reacts to give a high yield of a quinazolone, α-naphthylamine is not highly reactive. Suitable aromatic amines are aniline, o-, m- and p-toluidine, o-, m-, and p-anisidine, o-, m- and p-nitroaniline, o-, m- and p-chloroaniline, β-naphthylamine, phenylhydrazine, and the like. Benzylamine and menaphthylamine are representative examples of the aralkylamines.

The inert solvent-diluents employed may be any of the normally liquid aliphatic or aromatic hydrocarbons such as for example benzene, toluene and the like, the chloro derivatives thereof such as monochlorobenzene, monochlorotoluene and the like, normally liquid aliphatic hydrocarbons such as octane, solvent naphtha, kerosene and their chloro derivatives such as ethylene chloride, butyl chloride and chlorokerozene, and normally liquid nitrogenous heterocyclic bases such as pyridine, quinoline and the like.

The acid anhydrides of from 2 to 12 carbon atoms that are employed in this reaction include acetic, propionic, butyric, octanoic and decanoic anhydrides.

In addition to the foregoing illustrative ortho-aminocyclic carboxylic acids, primary organic amines and inert solvent-diluents all those disclosed in the said patent 2,439,386 may also be used with the same results.

The substituted 4-quinazolones prepared in accordance with the present invention may be utilized as intermediates for the preparation of various dyestuffs. More important is their use as hyponotics or soporifics.

The following examples will serve to further illustrate the invention. It is to be understood however that these examples are merely illustrative and are not to be construed as to be limitative of the invention claimed herein.

EXAMPLE 1

*2-methyl-3-(o-tolyl)-4-quinazolone*

54.8 grams (0.4 mol) of anthranilic acid is slurried to smoothness in 100 grams (.88 mol) of chlorobenzene. During 1 hour, 44.8 grams (.44 mol) of acetic anhydride is added. The temperature rises as the acetic anhydride is added. When it reaches 45° C. it is maintained at 45–50° while the remainder of the acetic anhydride is added. After addition is complete it is stirred for ½ hour, still at 45–50° C., followed by addition of 100 grams (0.94 mol) of o-toluidine. Slowly, during 1½ hours 46.0 grams (.33 mol) of phosphorus trichloride is added. The temperature rises to about 126° C. during addition of the phosphorus trichloride. After addition is complete it is stirred at the reflux for 1 hour. It is cooled to 100° C., and then 100 cc. of water is added. Then 68 grams of sodium hydroxide as a 30% by weight solution is carefully added followed by addition of sodium carbonate to Brilliant Yellow alkalinity. The chlorobenzene and excess o-toluidine are steam distilled off. It is stirred, cooled to 50° C. to crystallize the 2-methyl-3-(o-tolyl)-4-quinazolone. The product crystallizes as a slightly pink, hard, sandy crystal. It is filtered and washed well with cold water.

The crude material is dissolved at 30° C. in 2000 cc. of water with 150 grams of hydrochloric acid, 31.5% by weight, and treated with 6.0 grams of Nuchar (activated carbon). After about an hour, it is filtered. The filtrate is run slowly, during 1 hour, into 600 cc. of water containing 58 grams of sodium hydroxide while maintaining Brilliant Yellow alkalinity at all times. The product precipitates as a soft, fine white crystal. It is filtered, washed neutral with cold water, dried at 80° C. A product is obtained in 90% yield which has a M.P. of 116–117° C.

EXAMPLE 2

*2-methyl-3-(m-chlorophenyl)-4-quinazolone*

In a manner similar to that of Example 1, except that 119 grams of m-chloroaniline is substituted for the 100 grams of o-toluidine, a product is obtained in an approximate 90% yield which has a M.P. of 133–4° C.

EXAMPLE 3

*2-ethyl-3-phenyl-4-quinazolone*

In a manner similar to that of Example 1, except that 87.5 grams of aniline is substituted for 100 grams of o-toluidine and 57.2 grams of propionic anhydride for the 44.8 grams of acetic anhydride, a product is obtained in 91.5% yield which has a M.P. of 127–8° C.

EXAMPLE 4

*2-ethyl-3-(m-tolyl)-4-quinazolone*

In a manner similar to Example 1, except that 100 grams of m-toluidine is substituted for the 100 grams of o-toluidine and 57.2 grams of propionic anhydride for the 44.8 grams of acetic anhydride, a product is obtained in 74% yield which has a M.P. of 130–1° C.

EXAMPLE 5

*2-propyl-3-phenyl-4-quinazolone*

In a manner similar to Example 1, except that 87.5 grams of aniline is substituted for the 100 grams of o-toluidine and 69.4 grams of butyric anhydride is substituted for the 44.8 grams of acetic anhydride, 2-propyl-3-phenyl-4-quinazolone is obtained in good yield.

EXAMPLE 6

*2-methyl-3-(o-tolyl)-4-quinazolone*

250 grams of chlorobenzene and 137 grams of anthranilic acid are stirred to a smooth slurry. Over a period of an hour 112 grams of acetic anhydride is added, the temperature rising during the addition. When it reaches 45° C. it is maintained at 45–50° C. with external cooling as the remainder of the anhydride is added. After the addition is complete it is stirred 30 min. at 45–50° C. 250 grams of o-toluidine is added and then slowly, during 1 hour, 143 grams of thionyl chloride, followed by heating to 125–126° C. for 1 hour. It is cooled to 100° C., and 300 cc. of water added. 120 grams of caustic soda as a 40% solution is added carefully, followed by addition of 10–20 grams of soda ash to Brilliant Yellow alkalinity. Excess o-toluidine and the chlorobenzene are steam distilled off. The charge is cooled to 50° C. to crystatllize the 2-methyl-3-(o-tolyl)-4-quinazolone as light brown, hard, sandy crystals. It is filtered and washed with cold water.

The crude material is dissolved in an acidic solution consisting of 5000 cc. of water and 375 grams of hydrochloric acid 20° Bé. It is treated with Nuchar (activated carbon) and clarified. The clarified solution is then run into water maintained at Brilliant Yellow alkalinity. The purified product precipitates as fine while crystals. It is filtered and washed neutral with cold water and dried. The yield of product was 72% of theory with a M.P. of 116–117° C.

EXAMPLE 7

*2-methyl-3-phenyl-4-quinazolone*

Example 1 was repeated with the exception that the 100 grams of o-toluidine was replaced by 87.5 grams of aniline and the amount of chlorobenzene increased to 200 grams. The resulting product was obtained in high yield and has a high degree of purity.

EXAMPLE 8

*2-n-pentyl-3-phenyl-4-quinazolone*

Example 1 was repeated with the exception that the 100 grams of o-toluidine was replaced by 87.5 grams of aniline, the 44.8 grams of acetic anhydride was replaced by 94.2 grams of hexanoic anhydride and the amount of chlorobenzene was increased to 200 grams. The resulting product was obtained in 78% yield and has a high degree of purity.

EXAMPLE 9

*2-methyl-3-phenyl-4-quinazolone*

To 375 grams of chlorobenzene is added 179 grams of acetyl anthranilic acid, 218 grams of aniline and 60 grams of glacial acetic acid. It is stirred to a smooth slurry and then, during one hour, 115 grams of phosphorus trichloride is added. The temperature rises to about 125° C. It is stirred for one hour at 125 to 130° C., cooled to 100° C. and then 250 cc. of water is added, followed by addition of 170 grams of caustic soda as a 40% solution. 10 grams of sodium carbonate is then added to slight Brilliant Yellow alkalinity. The chlorobenzene and excess aniline are steam distilled. It is cooled to 50° C., and allowed to crystallize. It is filtered and washed well with cold water.

To a mixture of 5000 cc. of water and 168 grams of hydrochloric acid 20° Bé. at 60° C. the crude material is added and stirred to solution. 15 grams of Nuchar (activated carbon) is added. It is stirred and clarified. This solution is then run slowly into 1500 cc. of water and 60 grams of caustic soda, maintaining Brilliant Yellow alkaline at all times. It is stirred for one hour, filtered and washed well with cold water, and then dried. A white product is obtained in 88.6% yield, M.P. 149.4–151° C.

When the above example was repeated except that no acetic acid was used (method of USP 2,439,386) the resulting product was off-white with yellowish cast and had a somewhat lower melting point, M.P. 149–150.2° C.

We claim:

1. In the process of preparing substituted 4-quinazolones the improvement which comprises heating a mixture of 1 mole of o-amino-cyclic carboxylic acid selected from the class consisting of aromatic and heterocyclic carboxylic acids, 1 to 1½ moles of aliphatic acid anhydride, about 2 to 2½ moles of a primary amine selected from the class consisting of primary aliphatic, aromatic and araliphatic amines, the aromatic amine when containing a condensed ring system bearing the amine group in the $\beta$-position thereof, in the presence of 1 to 3 moles of a phosphorus chloride selected from the class consisting of phosphorus trichloride, phosphorus oxychloride and thionyl chloride and a normally liquid inert organic solvent.

2. The process as defined in claim 1, wherein the aliphatic acid anhydride is acetic anhydride.

3. The process as defined in claim 1, wherein the aliphatic acid anhydride is propionic anhydride.

4. The process as defined in claim 1, wherein the aliphatic acid anhydride is butyric anhydride.

5. The process as defined in claim 1, wherein the aliphatic acid anhydride is hexanoic anhydride.

References Cited by the Examiner

UNITED STATES PATENTS 2,915,521  12/59  Laubach et al. _____ 260—251

OTHER REFERENCES

Klosa, German application, 1,123,332, February 8, 1962.

Kauffmann: Berichte, vol. 42 (1909), pages 3481–2.

IRVING MARCUS, *Primary Examiner.*

NICHOLAS S. RIZZO, *Examiner.*